April 12, 1927.

T. MIDGLEY 1,624,617

BEVELING AND SEALING CLAMP

Filed July 24, 1925

INVENTOR.
Thomas Midgley
BY
Edward C. Taylor
ATTORNEY.

Patented Apr. 12, 1927.

1,624,617

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

BEVELING AND SEALING CLAMP.

Application filed July 24, 1925. Serial No. 45,901.

This invention relates to clamps for beveling or skiving the ends of rubber tubes during their vulcanization, and for sealing the ends of the tubes to their mandrels. The present invention is a modification of those shown in my copending applications Serial Nos. 45,899 filed July 24, 1925, and 45,900, filed July 24, 1925, and is directed primarily to simplicity of parts and to insurance against undue thinning down of the tube near its ends.

Referring to the drawings.

Figure 1:
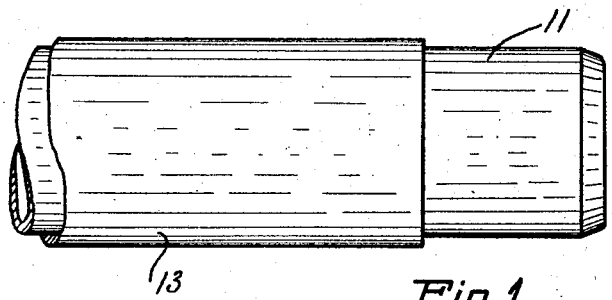
Fig. 1 is a view of a vulcanizing mandrel with an uncured rubber tube mounted thereon.

The clamp consists of two movable parts, a sleeve 10 formed internally to a close sliding fit upon the mandrel 11, and a ring 12 formed internally with a cylindrical bore just large enough to slip over the rubber tube 13. The outside of the sleeve is formed with a tapered portion 14 and a cylindrical portion 15 formed to a running fit with the bore of the ring 12, the portions 14 and 15 being preferably separated from each other by a shoulder 16. The ring is preferably cut away at 17 on one end of the bore so as to facilitate starting it over the end of the rubber.

Figure 2:
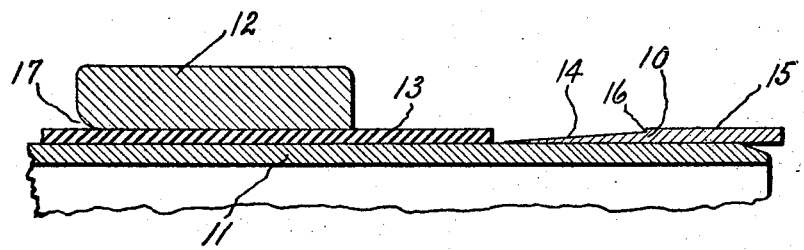
Fig. 2 is a partial section showing the start of the application of the clamp.
Figure 3:
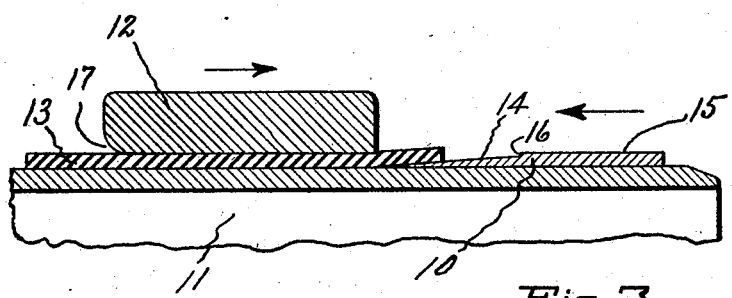
Fig. 3 is a similar section showing a further stage in the application.
Figure 4:
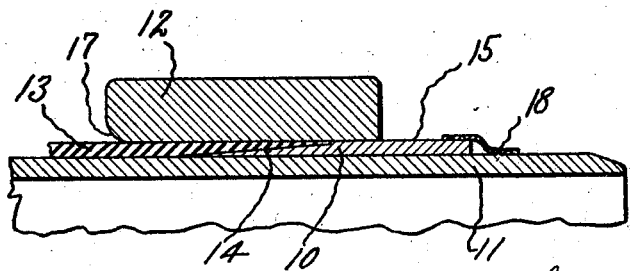
Fig. 4 is a similar section showing the clamp fully applied.

After the tube is mounted on the mandrel as in Fig. 1 the ring 12 is slipped over it to a position somewhat back of the end of the tube. The sleeve 10 is slid over the end of the mandrel with the tapered end foremost, the various parts being located in somewhat the positions shown in Fig. 2. By exerting hydraulic or mechanical pressure upon the ring and sleeve in the direction of the arrows in Fig. 3 these members are telescoped as in Fig. 4, pressing the tube between them. The rubber of the tube being still in its uncured state it is by this action forced into the space between the tapered portion 14 and the internal bore of the ring, any excess rubber being sheared off as the shoulder 16 and the ring pass. By moving the two parts of the clamp in opposite directions the body of the tube is not stretched, all action upon it being of a shearing nature near its ends. The shoulder 16 makes a finished end to the tube, avoiding the formation of a feather edge. The tube is vulcanized with the clamp in place.

If the mandrels upon which the clamp is to be used have a sufficiently small variation in diameter to permit it, the sleeve 10 may be made of a close enough fit to prevent the entrance of steam between it and the mandrel. In most cases, however, the variation between different mandrels is enough to forbid this accuracy of workmanship, and other sealing means must be used. A strip of adhesive rubber or tape 18 (Fig. 4), placed over the end of the sleeve as shown, will effectually prevent the entrance of steam underneath the rubber tube.

Having thus described my invention, I claim:

1. A tube beveling and sealing clamp comprising a sleeve having a bore of a size presenting a snug running fit over the mandrel upon which the clamp is to be used and provided on its outer surface with a tapered end portion and a cylindrical portion separated from each other by a slight shoulder, and a ring having a bore of a size presenting a snug running fit over the cylindrical portion of the sleeve.

2. A tube beveling and sealing clamp comprising a tapered sleeve to slide over the tube mandrel and underneath the tube, and a ring adapted to slide over the tube to compress it against the sleeve.

THOMAS MIDGLEY.